(12) United States Patent
Liu (10) Patent No.: US 9,856,635 B1
(45) Date of Patent: Jan. 2, 2018

(54) FAUCET STRUCTURE AND METHOD FOR ASSEMBLING SAME

(71) Applicant: HOKWANG INDUSTRIES CO., LTD., New Taipei (TW)

(72) Inventor: Shen-Chen Liu, New Taipei (TW)

(73) Assignee: Hokwang Industries Co., Ltd., New Taipei (TW)

( * ) Notice: Subject to any disclaimer, the term of this patent is extended or adjusted under 35 U.S.C. 154(b) by 48 days.

(21) Appl. No.: 15/196,925

(22) Filed: Jun. 29, 2016

(51) Int. Cl.
*E03C 1/05* (2006.01)
*G05D 7/06* (2006.01)
*A47K 5/12* (2006.01)
*A47K 10/48* (2006.01)

(52) U.S. Cl.
CPC ............ *E03C 1/057* (2013.01); *A47K 5/1217* (2013.01); *A47K 10/48* (2013.01); *G05D 7/0629* (2013.01); *A47K 2005/1218* (2013.01)

(58) Field of Classification Search
CPC .............................. A47K 10/48; E03C 1/0404
USPC ............ 137/315.11, 315.12, 801; 4/623, 678
See application file for complete search history.

(56) References Cited

U.S. PATENT DOCUMENTS

| | | | |
|---|---|---|---|
| 7,228,874 B2 * | 6/2007 | Bolderheij | E03C 1/04 137/801 |
| 8,997,271 B2 | 4/2015 | Bayley et al. | |
| 9,060,657 B2 | 6/2015 | Ryan et al. | |
| 9,220,382 B2 | 12/2015 | Liu | |
| 9,282,856 B2 | 3/2016 | Fukano | |
| 9,284,963 B2 | 3/2016 | Michael | |
| 2013/0199640 A1 * | 8/2013 | Williamson | E03C 1/04 137/594 |
| 2015/0354184 A1 * | 12/2015 | Lee | E03C 1/0404 29/890.141 |
| 2016/0160481 A1 * | 6/2016 | Lev | E03C 1/0404 137/801 |

* cited by examiner

*Primary Examiner* — Allana Lewin Bidder
*Assistant Examiner* — Nicholas Ros
(74) *Attorney, Agent, or Firm* — Muncy, Geissler, Olds & Lowe, P.C.

(57) ABSTRACT

A faucet structure and method for assembling same is disclosed. The structure includes an outer tube, flow guiding part and cap. The outer tube is provided with an assembling gap. The flow guiding part is provided within the outer tube, and with half shells. The first half shell is provided with supplying manifold passage(s) corresponded to the assembling gap, and a first assembling ramp facing the second half shell. The second half shell is provided with a second assembling ramp facing the first half shell and inclined oppositely to the first assembling ramp, and a first threaded connection portion facing one end opening of outer tube. The cap is in correspondence with the end opening, and provided with a second threaded connection portion corresponded to the first threaded connection portion. These threaded connection portions are engaged by threaded connection, while those half shells are pressed against a tube wall.

11 Claims, 11 Drawing Sheets

Fig. 8

FAUCET STRUCTURE AND METHOD FOR ASSEMBLING SAME

FIELD OF THE INVENTION

The present invention is related to a faucet structure of sanitary wares and method for assembling same.

BACKGROUND OF THE INVENTION

It is known that creative design and efficient use of space are required by people increasingly day by day. The creative impression provided by conventional sanitary wares could not meet the requirement of the user any more. Taking a hand dryer as an example, a certain volume is generally taken up by a commonly used modern hand dryer, as disclosed in patents, such as U.S. Pat. No. 9,060,657, U.S. Pat. No. 9,284,963, U.S. Pat. No. 9,282,856 and etc. Thus, it is necessary to look for connections corresponding to hidden conduit wiring and a wall surface to be utilized effectively for installing the hand dryer. In addition, the hand dryer may be used only when the user approaches after hands are cleaned, because all the modern hand dryers are installed a certain distance away from sinks.

A hand dryer exposing air-discharging faucet structure only, disclosed in patents, such as U.S. Pat. No. 8,997,271, U.S. Pat. No. 9,220,382 and etc., is then proposed by related industries. The problem of necessity of a larger space for building up the conventional hand dryer is solved by the embodiments disclosed in these patents practically. However, the structure of a part of the hand dryer, which is used for drying hands, is designed to be reduced significantly within a limited space in the faucet, such that how to combine parts, such as a flow guiding part and a sensing element, into an integrally formed outer tube is considered by related industries urgently. Accordingly, a structure and method for assembling same is proposed by the applicant to solve the above-mentioned problem.

SUMMARY OF THE INVENTION

It is the main object of the present invention to solve the problem of how to mount essential parts into an integrally formed outer tube.

For achieving the above-mentioned object, the present invention provides a faucet structure including an outer tube, a flow guiding part and a cap. The outer tube is integrally formed such that there is provided with a tube wall, a hollow passage formed by the tube wall, two end openings located at two opposite sides of the hollow passage, respectively, and an assembling gap passing through the tube wall and communicated with the hollow passage. The flow guiding part is provided within the hollow passage and provided with a first half shell and a second half shell assembled together. The first half shell is provided with at least one supplying manifold passage provided to correspond to the assembling gap and communicated with the hollow passage, and a first assembling ramp facing the second half shell. The second half shell is provided with a second assembling ramp facing the first half shell and inclined oppositely to the first assembling ramp, such that the second half shell is combined with the first half shell in an assembling direction, and a first threaded connection portion provided as facing one of the end openings of the outer tube at which the assembling direction is directed. The cap is fitted to one of the end openings of the outer tube at which the assembling direction is directed, and provided with a sheltering portion corresponded to the end opening, and a second threaded connection portion corresponded to the first threaded connection portion. In this case, the second threaded connection portion is engaged with the first threaded connection portion through threaded connection, as well as the first half shell and the second half shell are pressed against the tube wall on the completion of the engagement.

In one embodiment, the first half shell is provided with a mounting opening openingly provided adjacent to the supplying manifold passage and fitted therein with a sensing element. The mounting opening is also provided in correspondence with the assembling gap.

In one embodiment, the first half shell is provided with two supplying manifold passages. These supplying manifold passages are extended along the axis of the outer tube and located on the same extension line, respectively.

In one embodiment, the first half shell is provided with a mounting opening provided between the two supplying manifold passages and mounted therein with a sensing element.

In one embodiment, the air-discharging structure of hand dryer is provided with a flexible lining tube fitted within the outer tube as well as located between the tube wall and the flow guiding part.

In one embodiment, the flexible lining tube is provided with a fitting opening located at the assembling gap and shaped the same as the assembling gap so as to allow the supplying manifold passage to be placed therein.

In one embodiment, the first threaded connection portion is composed of an accommodating groove provided on the second half shell and a nut placed inside the accommodating groove, the accommodating groove being presented as a hollowed-out portion facing one of the end openings at which the assembling direction is directed, while the second threaded connection portion is composed of a through-hole openingly provided in the sheltering portion and corresponded to the hollowed-out portion, and a bolt passingly provided through the through-hole and capable of engaging with the nut.

In one embodiment, the cap is provided with an accommodating portion located in the sheltering portion and depressed inwardly into the outer tube so as to allow a light-emitting module to be placed therein, and provided with a decorative panel covering the sheltering portion and being pervious to light generated by the light-emitting module.

In addition to the above-mentioned object, the present invention also provides a method for assembling faucet structure including the steps as follows:

step one: providing an outer tube, on which an assembling gap is provided;

step two: combining a first half shell into the outer tube, entering the first half shell into the outer tube through a hollow passage formed by the outer tube and placing at least one supplying manifold passage of the first half shell in correspondence with the assembling gap;

step three: combining a second half shell into the outer tube, entering the second half shell into the outer tube in an assembling direction and then moving it toward the first half shell, followed by sliding the second half shell on a first assembling ramp of the first half shell via a second assembling ramp;

step four: mounting a cap to one of the end openings, at which the assembling direction is directed, of the outer tube, while a sheltering portion of the cap closing the end opening, as well as placing a second threaded connection portion of the cap in correspondence with a first threaded connection portion of the second half shell and threadedly connecting the first threaded connection portion with the second threaded connection portion, such that the second half shell is moved toward the cap for assembling, and the first assembling ramp and the second assembling ramp are abutted together during assembling process for pressing the first half shell and the second half shell against each other to complete the assembly.

In one embodiment, the step two further includes a sub-step: combining a flexible lining tube into the outer tube, in which the flexible lining tube is entered through the hollow passage formed by the outer tube, and the flexible lining tube is positioned in correspondence with the assembling gap.

In one embodiment, the step four includes a sub-step: mounting a light-emitting module and a decorative panel, in which the light-emitting module is placed into an accommodating portion, and the decorative panel is then placed in correspondence with the sheltering portion.

In comparison with prior art, features of the present invention are obtained via the above-mentioned technical scheme. The features are as follows. The problem of how to combine related parts into an integrally formed outer tube is solved by the faucet structure and method for assembling same disclosed in the present invention practically. Moreover, the flow guiding part is combined into the outer tube through abutment between the first half shell and the second half shell, so as to further avoid occurrence of the problem of incapability of mounting the flow guiding part practically. In addition, there is no need to build up assembled structure within the outer tube in the embodiment disclosed in the present invention. Thus, the structure and the manufacturing of each part may be simplified practically.

DETAILED DESCRIPTION OF THE PREFERRED EMBODIMENTS

Now, the detailed description and technical contents of the present invention will be described in accompany with drawings as follows.

Referring to FIGS. 1 to 4, the present invention provides a faucet structure 1. The faucet structure 1 is allowed to connect with a supplying device 2 as desired for implementation. The supplying device 2 may be a water-supplying device, a cleaning fluid-supplying device or a blowing device. When the approach of human hands is detected by a sensing element 3 arranged within the faucet structure 1, the supplying device 2 connected with the sensing element 3 is then requested to operate, so as to supply a cleaning fluid. After received by the faucet structure 1, the cleaning fluid is then supplied to the human hands for cleaning. Moreover, the cleaning fluid may be varied depending upon variety of the supplying device 2. For instance, the cleaning fluid may be clean water, cleaning soap, hand-drying air and etc. Additionally, the faucet structure 1 of the present invention may be embodied in desk mount type described in FIG. 1 or wall mount type as disclosed in FIG. 2.

Figure 1:
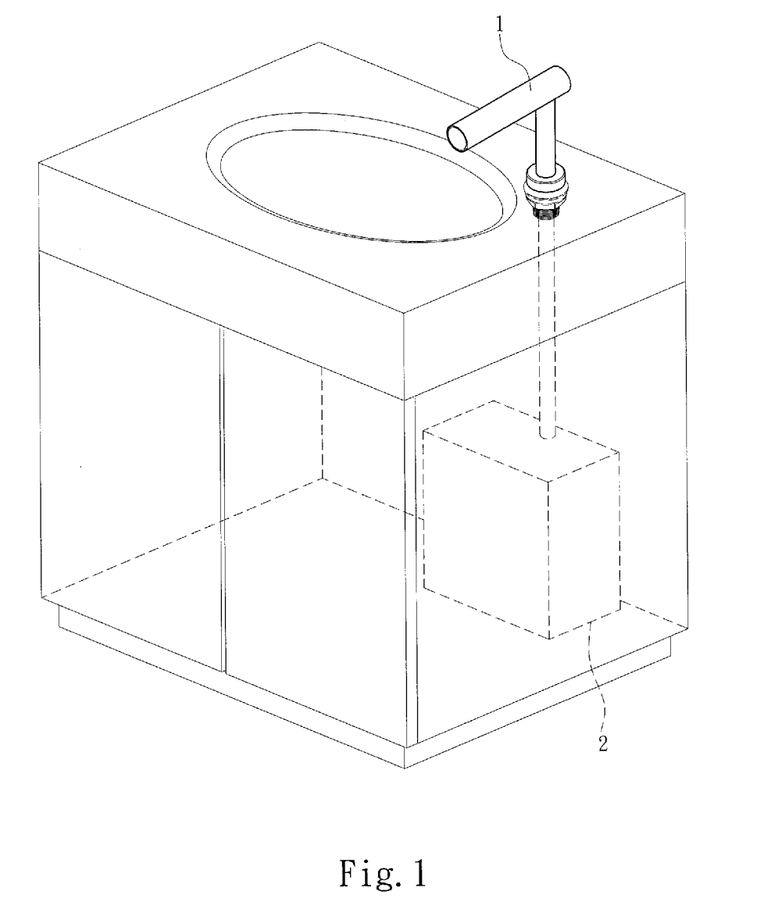
FIG. 1 is a diagram of a faucet structure of the present invention embodied in a desk mount type.
Figure 2:
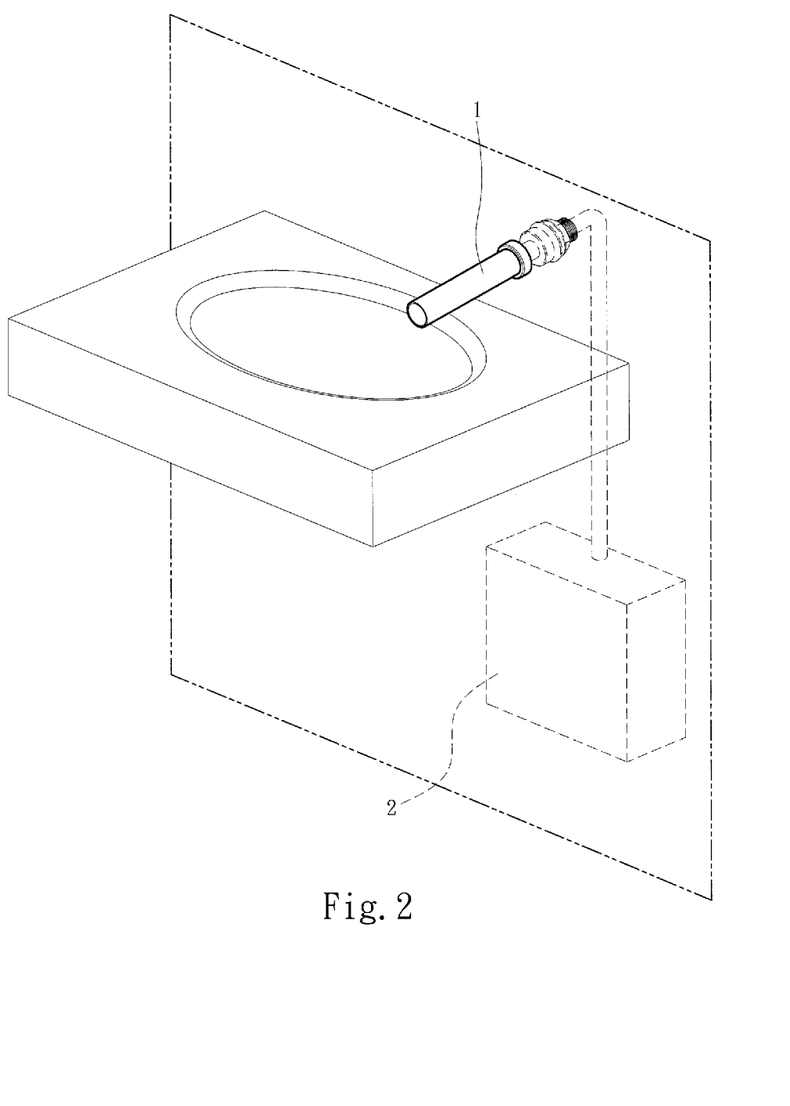
FIG. 2 is a diagram of a faucet structure of the present invention embodied in a wall mount type.
Figure 3:
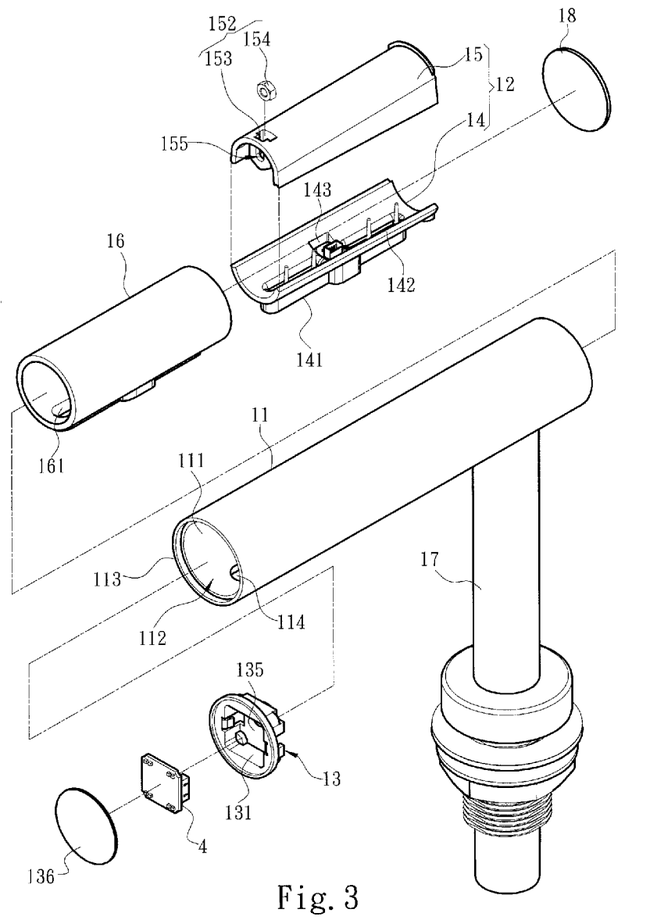
FIG. 3 is a structural exploded diagram (1) of a faucet structure according to one embodiment of the present invention.
Figure 4:
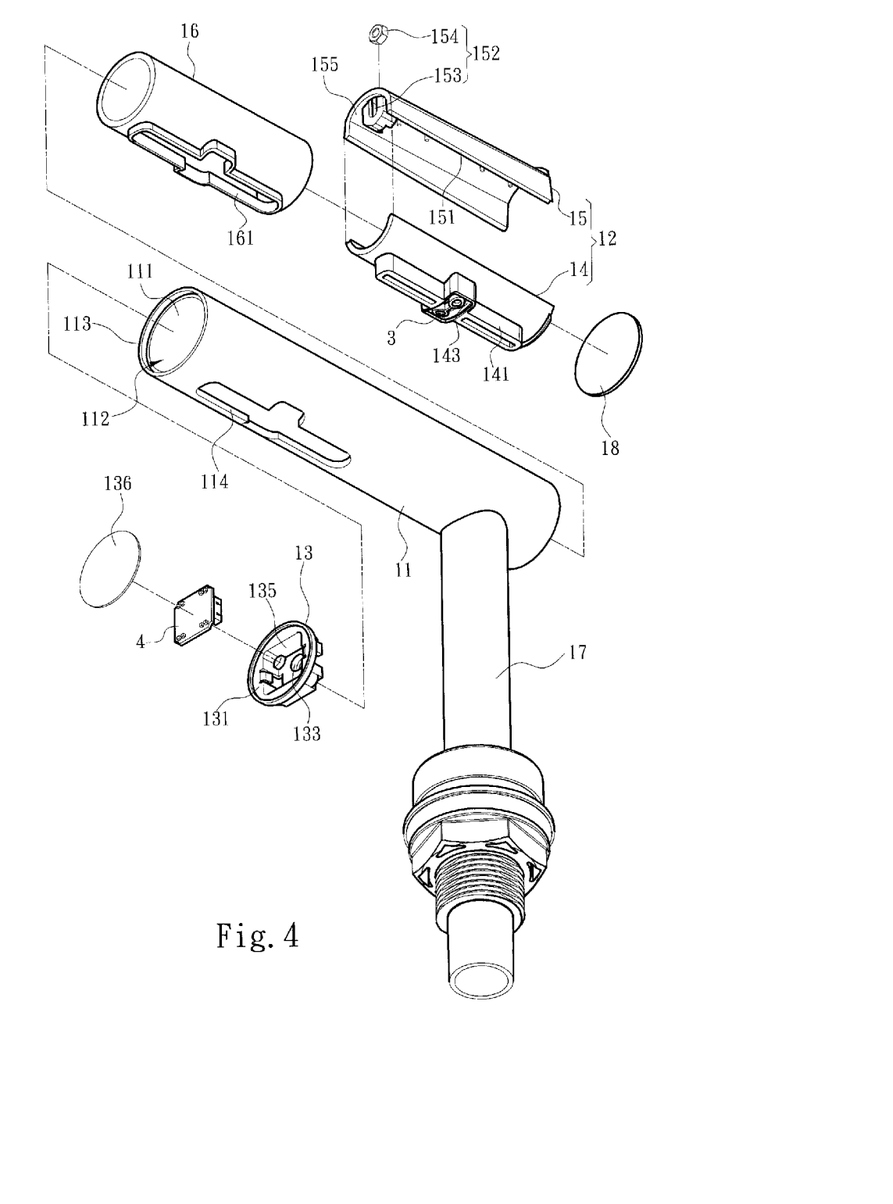
FIG. 4 is a structural exploded diagram (2) of the faucet structure according to the embodiment of the present invention.
Figure 5:
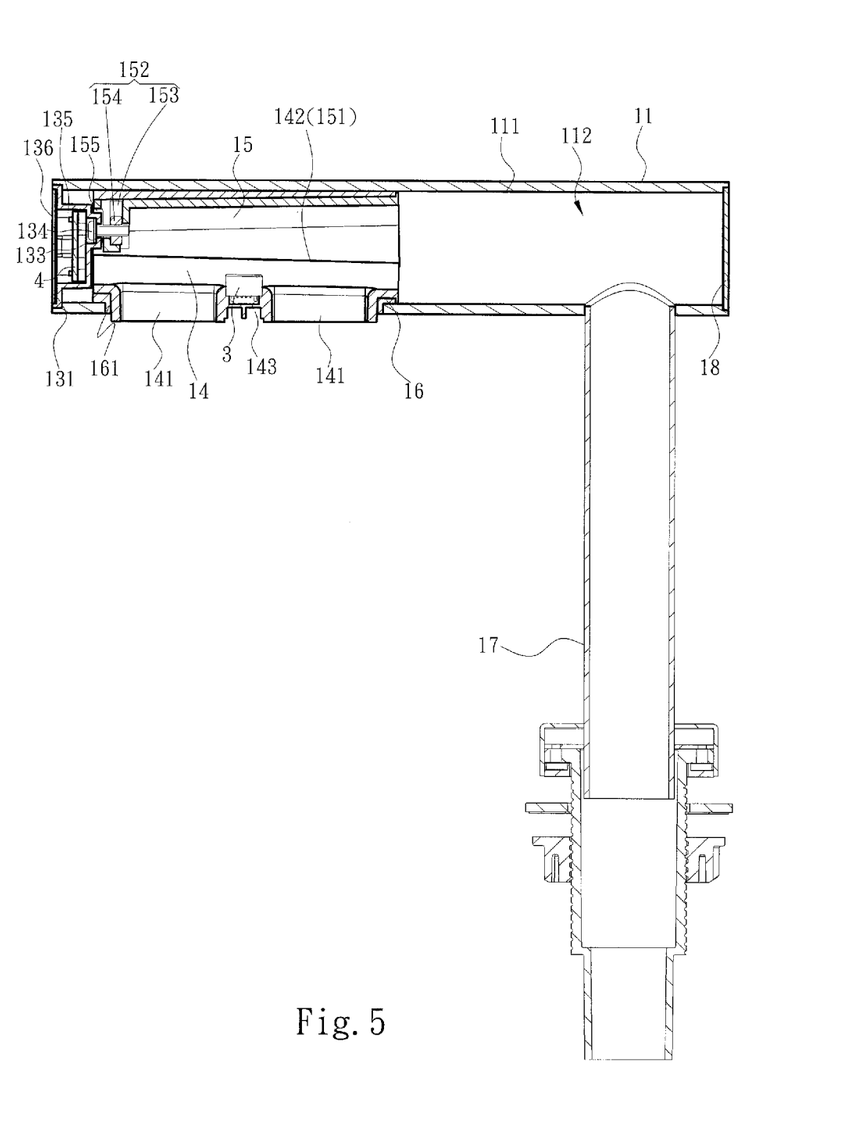
FIG. 5 is a structural cross-section diagram of the faucet structure according to the embodiment of the present invention.
Figure 6:
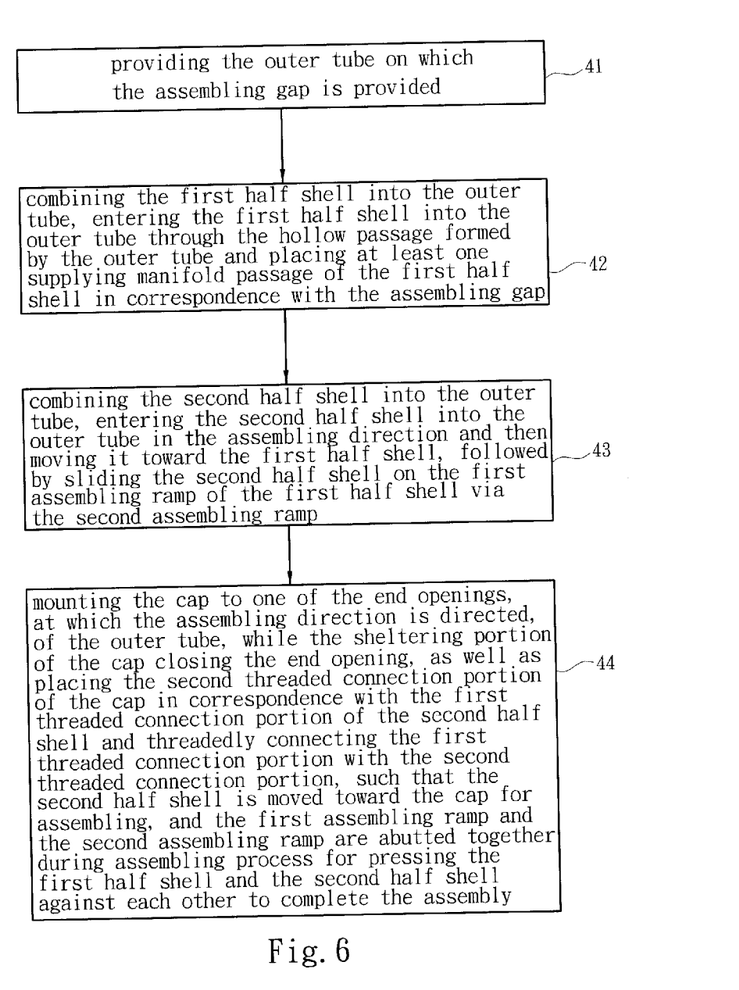
FIG. 6 is flow chart of assembling the faucet structure according to the embodiment of the present invention.

Referring to FIGS. 3 to 5, the faucet structure 1 of the present invention includes an outer tube 11, a flow guiding part 12 and a cap 13. In this case, the outer tube 11 is integrally formed of a metal material or a plasticized material. The outer tube 11 may be connected with a manifold 17 as desired for implementation. The manifold 17 may be further formed by integrally connecting with the outer tube 11. The outer tube 11 is provided with a tube wall 111, a hollow passage 112 formed by the tube wall 111, two end openings 113 located at two opposite sides of the hollow passage 112, respectively, and an assembling gap 114 passing through the tube wall 111 and communicated with the hollow passage 112. The flow guiding part 12 is provided within the hollow passage 112 and provided with a first half shell 14 and a second half shell 15 assembled together. Each of the first half shell 14 and the second half shell 15 is a semi-annular shell, respectively. After the first half shell 14 and the second half shell 15 are assembled, the cleaning fluid is still allowed to pass therethrough. Specifically, the first half shell 14 is provided with at least one supplying manifold passage 141 provided to correspond to the assembling gap 114 and communicated with the hollow passage 112, and a first assembling ramp 142 facing the second half shell 15. Furthermore, the second half shell 15 is provided with a second assembling ramp 151 facing the first half shell 14 and inclined oppositely to the first assembling ramp 142, and a first threaded connection portion 152 provided as facing one of the end openings 113 of the outer tube 11. Moreover, the second half shell 15 of the present invention is provided with an assembling direction 5 (referring FIG. 7B) due to opposite orientations of the first assembling ramp 142 and the second assembling ramp 151, while the first threaded connection portion 152 is provided as facing one of the end openings 113 at which the assembling direction 5 is directed.

Figure 7A:
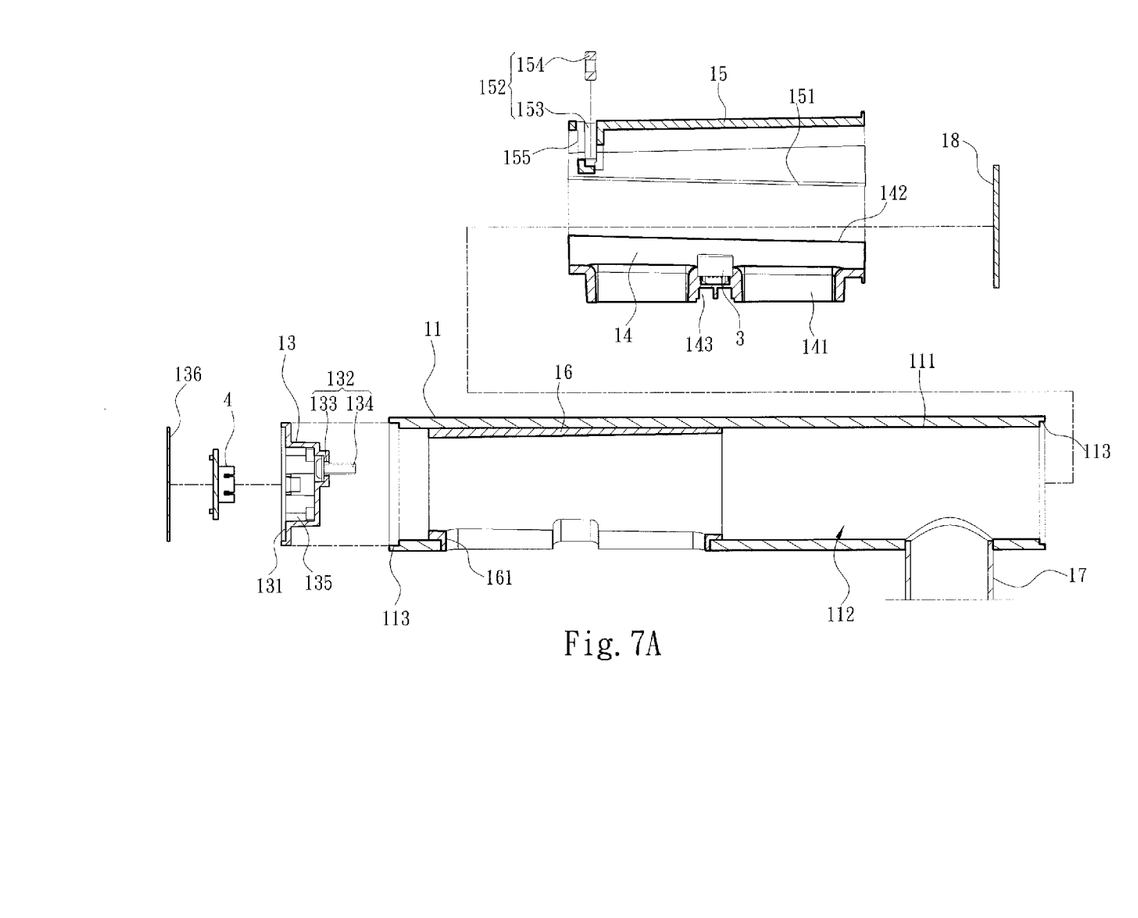
FIG. 7A is a sequential diagram (1) illustrating the assembly of the faucet structure according to the embodiment of the present invention.
Figure 7B:
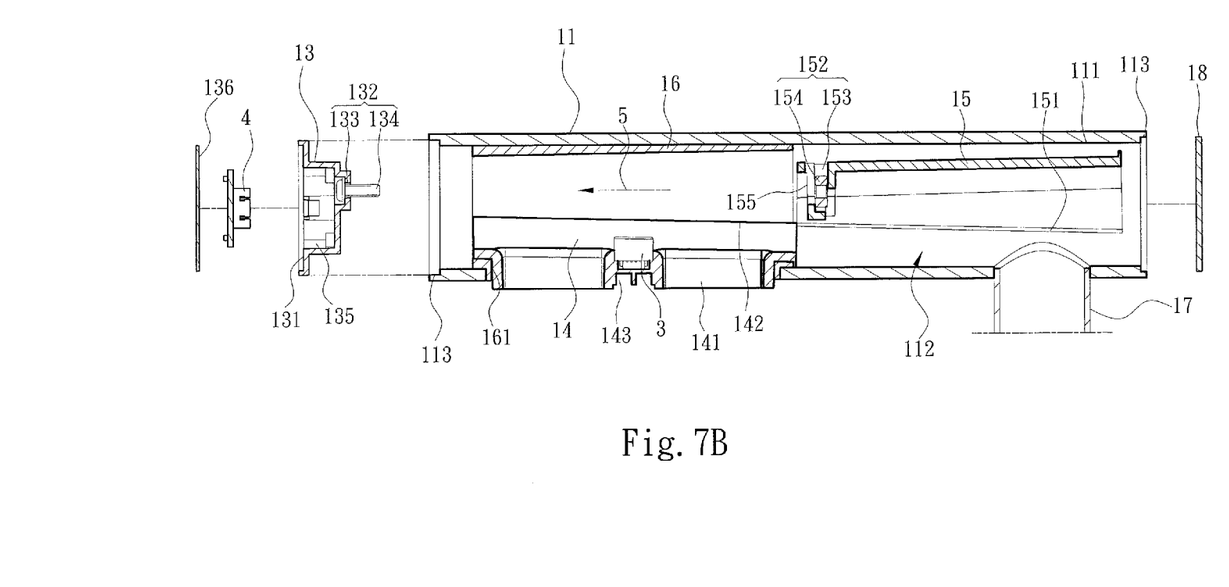
FIG. 7B is a sequential diagram (2) illustrating the assembly of the faucet structure according to the embodiment of the present invention.
Figure 7C:
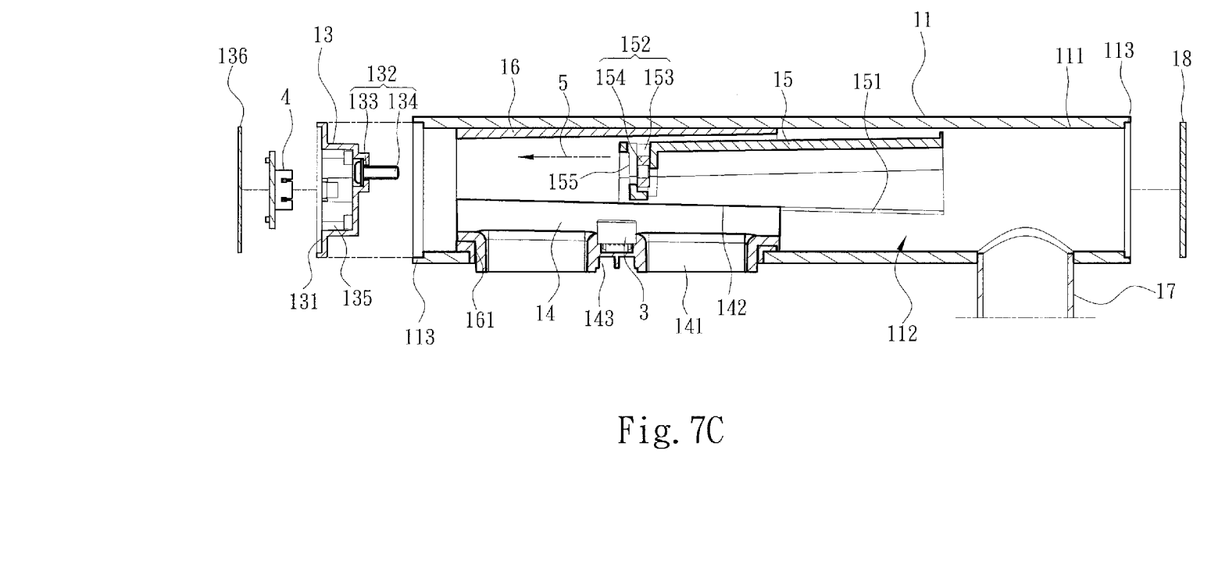
FIG. 7C is a sequential diagram (3) illustrating the assembly of the faucet structure according to the embodiment of the present invention.
Figure 7D:
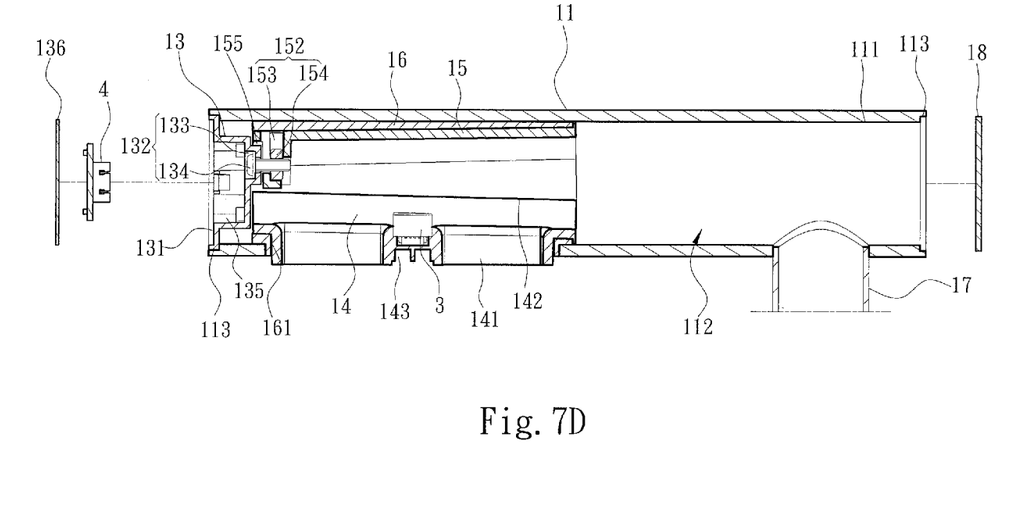
FIG. 7D is a sequential diagram (4) illustrating the assembly of the faucet structure according to the embodiment of the present invention.

Moreover, the cap 13 is fitted to one of the end openings 113 of the outer tube 11 at which the assembling direction 5 is directed. The cap 13 is provided with a sheltering portion 131 corresponded to the end opening 113, and a second threaded connection portion 132 (as illustrated in FIG. 7A) corresponded to the first threaded connection portion 152. Specifically, the first threaded connection portion 152 and the second threaded connection portion 132 are allowed to engage with each other through threaded connection. In one embodiment, the first threaded connection portion 152 is composed of an accommodating groove 153 provided on the second half shell 15 and a nut 154 placed inside the accommodating groove 153. The accommodating groove 153 is further presented as a hollowed-out portion 155 facing one of the end openings 113 at which the assembling direction 5 is directed. Additionally, the second threaded connection portion 132 is composed of a through-hole 133 openingly provided in the sheltering portion 131 and corresponded to the hollowed-out portion 155, and a bolt 134 passingly provided through the through-hole 133 and capable of engaging with the nut 154. In addition, the faucet structure 1 of the present invention is provided, at another end opening 113 without the cap 13 mounted thereto, with a closure cap 18.

Moreover, referring to FIGS. 3 to 7D collectively, the faucet structure 1 of the present invention is assembled in accordance with an assembling method described below, the assembling method including the steps as follows:

step one 41: providing the outer tube 11, on which the assembling gap 114 is provided; step two 42: combining the first half shell 14 into the outer tube 11, entering the first half shell 14 into the outer tube 11 through the hollow passage 112 formed by the outer tube 11 and placing the at least one supplying manifold passage 141 of the first half shell 14 in correspondence with the assembling gap 114; step three 43: combining the second half shell 15 into the outer tube 11, entering the second half shell 15 into the outer tube 11 in the assembling direction 5 and then moving it toward the first half shell 14, followed by sliding the second half shell 15 on the first assembling ramp 142 of the first half shell 14 via the second assembling ramp 151; step four 44: mounting the cap 13 to one of the end openings 113, at which the assembling direction 5 is directed, of the outer tube 11, while the sheltering portion 131 of the cap 13 closing the end opening 113, as well as placing the second threaded connection portion 132 of the cap 13 in correspondence with the first threaded connection portion 152 of the second half shell 15 and threadedly connecting the first threaded connection portion 152 with the second threaded connection portion 132, such that the second half shell 15 is moved toward the cap 13 for assembling, and the first assembling ramp 142 and the second assembling ramp 151 are abutted together during assembling process for pressing the first half shell 14 and the second half shell 15 against each other to complete the assembly.

Specifically, at the beginning of the assembly of the faucet structure 1 of the present invention, the outer tube 11 manufactured by machining and also formed with the assembling gap 114 is provided, followed by the step two 42. During the step two 42, entering the first half shell 14 into the hollow passage 112 from the two end openings 113 of the outer tube 11, and slipping it along the hollow passage 112, until the at least one supplying manifold passage 141 of the first half shell 14 is entrapped into the assembling gap 114 and the displacement of the first half shell 14 is restricted, so as to complete the step two 42. Subsequently, the step three 43 is performed to put the second half shell 15 into the outer tube 11. The second half shell 15 is required to enter into the hollow passage 112 through one of the end openings 113 which the first assembling ramp 142 faces, and the inclination of the second assembling ramp 151 is adjusted as required to be opposite to the inclination of the first assembling ramp 142 before entering the second half shell 15. Afterwards, the second half shell 15 is allowed to slide in the hollow passage 112, so as to enable the second half shell 15 to slide on the first assembling ramp 142 of the first half shell 14 via the second assembling ramp 151 thereof. During this step, a moderate slippage with respect to the first half shell 14 is required for the second half shell 15, until the first threaded connection portion 152 and the second threaded connection portion 132 are threadedly connected when the cap 13 is combined, followed by entering the step four 44. The cap 13 is mounted to the end opening 113 which the first threaded connection portion 152 faces. At first, the sheltering portion 131 is provided in correspondence with the end opening 113, while the cap 13 is positioned such that the first threaded connection portion 152 is allowed to correspond to the second threaded connection portion 132, and the first threaded connection portion 152 is enabled to threadedly connect with the second threaded connection portion 132. Furthermore, during the threadedly connecting process, the second half shell 15 is displaced toward the cap 13 gradually under the effect of threaded connection. In the meantime, the second half shell 15 and the first half shell 14 are abutted against the tube wall 111, under the effect of the first assembling ramp 142 and the second assembling ramp 151, respectively. On the completion of threaded connection, furthermore, the first half shell 14 and the second half shell 15 are pressed against the tube wall 111 so as to complete the mounting of the flow guiding part 12.

In one embodiment of the present invention, the assembling gap 114 of the present invention is extendingly provided along the axis of the outer tube 11, as illustrated in FIG. 4. As such, each supplying manifold passage 141 of the flow guiding part 12 is also allowed to be extendingly provided along the axis of the outer tube 11 in the present invention. Thereby, it is only necessary for the user to incline hands moderately to carry the cleaning fluid provided by each supplying manifold passage 141, and the possibility of splashing the cleaning fluid on human clothing is reduced. For instance, when the hand-drying air is received by the faucet structure 1 from the blowing device, the hand-drying air is guided by each supplying manifold passage 141 and then spurted toward the human hands along the axis of the outer tube 11. Only moderate inclination of the human hands with respect to this axial direction is required to enable the water remained on the human hands to evaporate or drop under the effect of hand-drying air. Specifically, splashing water all around due to the hand-drying air is avoided. Further, the first half shell 14 of the present invention is provided with the mounting opening 143 openingly provided adjacent to the supplying manifold passage 141 and fitted therein with the sensing element 3. Furthermore, the mounting opening 143 is also provided in correspondence with the assembling gap 114, and located within the assembling gap 114 after the combination of the first half shell 14 is completed. Referring to FIG. 4 again, moreover, the first half shell 14 in one embodiment is provided with two supplying manifold passages 141. These supplying manifold passages 141 are extended along the axis of the outer tube 11 and located on the same extension line, respectively. In this embodiment, further, the mounting opening 143 may be provided between the two supplying manifold passages 141, such that the sensing element 3 is just located between the two supplying manifold passages 141 after the assembly is completed. In this way, when the human hands are detected by the sensing element 3 so as to supply the cleaning fluid via the two supplying manifold passages 141, the cleaning fluid may be applied to the human hands more completely.

Figure 8:
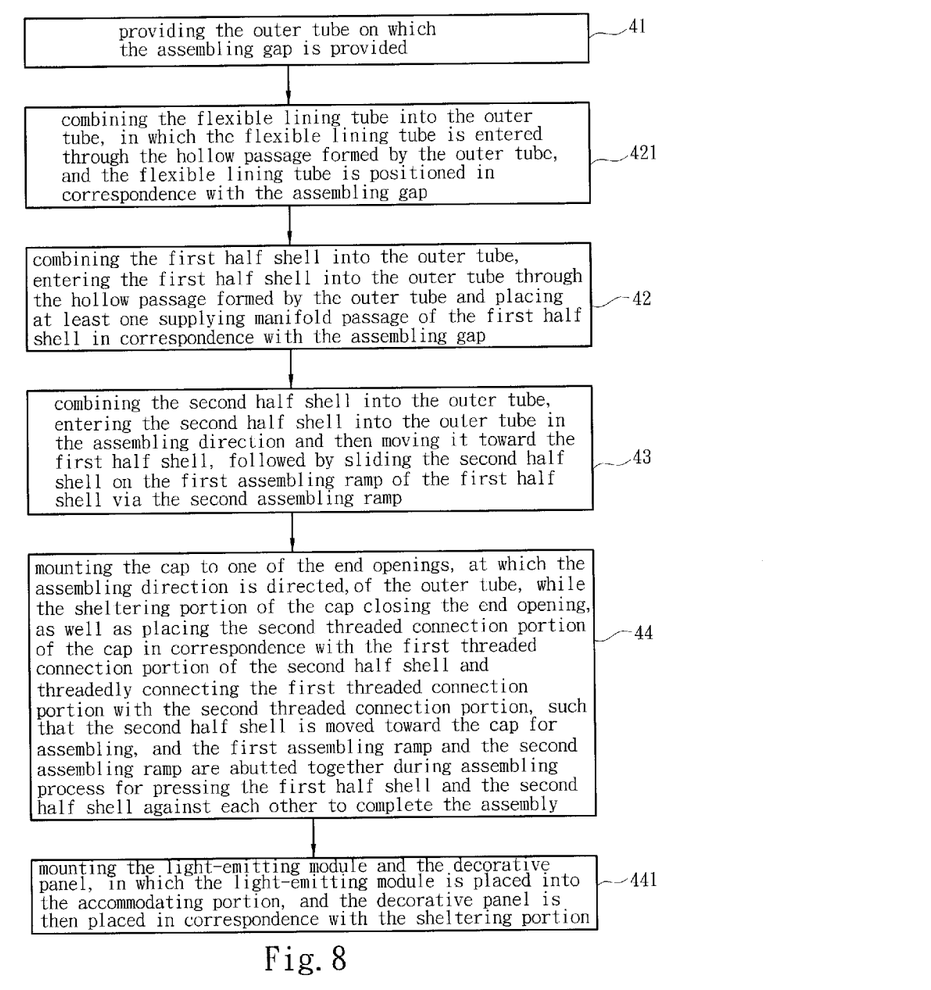
FIG. 8 is a flow chart of assembling a faucet structure according to another embodiment of the present invention.

Referring to FIGS. 7A to 8 together, in one embodiment, the faucet structure 1 further includes a flexible lining tube 16 fitted within the outer tube 11 as well as located between the tube wall 111 and the flow guiding part 12. The flexible lining tube 16 may be made of plastic materials having moderate flexibility. The clearance presented between the assembled tube wall 111 and the flow guiding part 12 may be eliminated to form air tightness by providing the flexible lining tube 16, in such a way the exudation of the cleaning fluid through this clearance may be avoided. Further, the flexible lining tube 16 is further provided with a fitting opening 161 located at the assembling gap 114 and shaped the same as the assembling gap 114 so as to allow the supplying manifold passage 141 to be placed therein. In this embodiment, moreover, the step two 42 of the assembling method of the present invention further includes a sub-step 421: combining the flexible lining tube 16 into the outer tube 11, in which the flexible lining tube 16 is entered through the hollow passage 112 formed by the outer tube 11, and the flexible lining tube 16 is positioned in correspondence with the assembling gap 114. Specifically, the flexible lining tube 16 is combined prior to the combination of the first half shell 14, such that the flexible lining tube 16 is sandwiched by the combined first half shell 14 and the outer tube 11 to achieve air tightness. In addition, during the second half shell 15 is combined, the second half shell 15 is further provided in a hollow region formed by the flexible lining tube 16, and then combined with the first half shell 14 within the flexible lining tube 16. On the completion of combining the first half shell 14 with the second half shell 15, the flexible lining tube 16 is also compressed, so as to reduce the clearance between components generated during the assembling process.

In one embodiment, referring to FIGS. 7A to 8 again, the cap 13 is provided with an accommodating portion 135 located in the sheltering portion 131 and depressed inwardly into the outer tube 11 so as to allow a light-emitting module 4 to be placed therein, and provided with a decorative panel 136 covering the sheltering portion 131 and being pervious to light generated by the light-emitting module 4. In this case, the accommodating portion 135 is sized and shaped in accordance with the structure of the light-emitting module 4 correspondingly. The light-emitting module 4 may be used as an indicator for the state of supply of the cleaning fluid to prompt the user through change in color or glittering brightness. Furthermore, the shape of the decorative panel 136 is adapted to the end opening 113. Besides, the decorative panel 136 is designed to possess a translucent region and a non-translucent region, such that light generated by the electrically-powered light-emitting module 4 may be emitted through the translucent region. In this embodiment, moreover, the step four 44 of the assembling method of the present invention further includes a sub-step 441: mounting the light-emitting module 4 and the decorative panel 136, in which the light-emitting module 4 is placed into the accommodating portion 135, and the decorative panel 136 is then placed in correspondence with the sheltering portion 131. Specifically, the light-emitting module 4 and the decorative panel 136 are assembled after threaded connection of the cap 13 with the second half shell 15 is completed. Initially, the light-emitting module 4 is mounted, in which the power required for the operation of the light-emitting module 4 is obtained from a control unit or a power unit via an electrical wire passing through the hollow passage 112, followed by combining the decorative panel 136. The decorative panel 136 may be combined onto the end opening 113 insertedly and allowed for closing the end opening 113 entirely after the assembly is completed.

The present invention has been detailed described above. However, the above description is only one preferred embodiment of the present invention, and should not be construed as limiting the scope of the present invention. All equivalent variations and modifications made in accordance with the patent claims should fall within the scope of the present invention.

What is claimed is:

1. A faucet structure, comprising:
    an outer tube, integrally formed such that there is provided with a tube wall, a hollow passage formed by said tube wall, two end openings located at two opposite sides of said hollow passage, respectively, and an assembling gap passing through said tube wall and communicated with said hollow passage;
    a flow guiding part, provided within said hollow passage and provided with a first half shell and a second half shell assembled together, said first half shell being provided with at least one supplying manifold passage provided to correspond to said assembling gap and communicated with said hollow passage, and a first assembling ramp facing said second half shell, said second half shell being provided with a second assembling ramp facing said first half shell and inclined oppositely to said first assembling ramp, such that said second half shell is combined with said first half shell in an assembling direction, and a first threaded connection portion provided as facing one of said end openings of said outer tube at which said assembling direction is directed; and
    a cap, fitted to one of said end openings of said outer tube at which said assembling direction is directed, and provided with a sheltering portion corresponded to said end opening, and a second threaded connection portion corresponded to said first threaded connection portion, wherein said second threaded connection portion is engaged with said first threaded connection portion through threaded connection, as well as said first half shell and said second half shell are pressed against said tube wall on the completion of the engagement.

2. The faucet structure according to claim 1, wherein said first half shell is provided with a mounting opening openingly provided adjacent to said supplying manifold passage and fitted therein with a sensing element, said mounting opening being also provided in correspondence with said assembling gap.

3. The faucet structure according to claim 1, wherein said cap is provided with an accommodating portion located in said sheltering portion and depressed inwardly into said outer tube so as to allow a light-emitting module to be placed therein, and provided with a decorative panel covering said sheltering portion and being pervious to light generated by said light-emitting module.

4. The faucet structure according to claim 1, wherein said first half shell is provided with two supplying manifold passages, said supplying manifold passages being extended along the axis of said outer tube and located on the same extension line, respectively.

5. The faucet structure according to claim 4, wherein said first half shell is provided with a mounting opening provided between said two supplying manifold passages and mounted therein with a sensing element.

6. The faucet structure according to claim 5, wherein said first threaded connection portion is composed of an accommodating groove provided on said second half shell and a nut placed inside said accommodating groove, said accommodating groove being presented as a hollowed-out portion facing one of said end openings at which said assembling direction is directed, while said second threaded connection portion is composed of a through-hole openingly provided in said sheltering portion and corresponded to said hollowed-out portion, and a bolt passingly provided through said through-hole and capable of engaging with said nut.

7. The faucet structure according to claim 5, further comprising a flexible lining tube fitted within said outer tube as well as located between said tube wall and said flow guiding part.

8. The faucet structure according to claim 7, wherein said flexible lining tube is provided with a fitting opening located at said assembling gap and shaped the same as said assembling gap so as to allow said supplying manifold passage to be placed therein.

9. A method for assembling faucet structure comprising the steps as follows:
  step one: providing an outer tube, on which an assembling gap is provided;
  step two: combining a first half shell into said outer tube, entering said first half shell into said outer tube through a hollow passage formed by said outer tube and placing at least one supplying manifold passage of said first half shell in correspondence with said assembling gap;
  step three: combining a second half shell into said outer tube, entering said second half shell into said outer tube in an assembling direction and then moving it toward said first half shell, followed by sliding said second half shell on a first assembling ramp of said first half shell via a second assembling ramp;
  step four: mounting a cap to one of said end openings, at which said assembling direction is directed, of said outer tube, while a sheltering portion of said cap closing said end opening, as well as placing a second threaded connection portion of said cap in correspondence with a first threaded connection portion of said second half shell and threadedly connecting said first threaded connection portion with said second threaded connection portion, such that said second half shell is moved toward said cap for assembling, and said first assembling ramp and said second assembling ramp are abutted together during assembling process for pressing said first half shell and said second half shell against each other to complete the assembly.

10. The method for assembling faucet structure according to claim 9, wherein said step two further comprises a sub-step: combining a flexible lining tube into said outer tube, said flexible lining tube being entered through said hollow passage formed by said outer tube, said flexible lining tube being positioned in correspondence with said assembling gap.

11. The method for assembling faucet structure according to claim 10, wherein said step four further comprises a sub-step: mounting a light-emitting module and a decorative panel, said light-emitting module being placed into an accommodating portion, and said decorative panel being then placed in correspondence with said sheltering portion.

* * * * *